United States Patent [19]
Omori et al.

[11] 4,392,951
[45] Jul. 12, 1983

[54] SCREEN FILTER

[75] Inventors: Toshiyuki Omori; Kunihiro Abe, both of Kitakyushu, Japan

[73] Assignee: Kao Soap Co. Ltd., Tokyo, Japan

[21] Appl. No.: 230,393

[22] Filed: Feb. 2, 1981

[30] Foreign Application Priority Data

Aug. 20, 1979 [JP] Japan .............................. 54-106526
Nov. 10, 1980 [JP] Japan .............................. 55-158552

[51] Int. Cl.³ .............................................. B01D 33/14
[52] U.S. Cl. .................................. 209/307; 209/364; 209/400
[58] Field of Search ............... 209/400, 364, 307, 308, 209/233, 659, 665, 674

[56] References Cited

U.S. PATENT DOCUMENTS

| 835,805 | 11/1906 | Backstrom | 209/400 |
| 1,232,052 | 7/1917 | Landahl | 209/400 |
| 3,002,618 | 10/1961 | Derderian et al. | 209/307 |

Primary Examiner—Frank Sever
Attorney, Agent, or Firm—Philip M. Hinderstein

[57] ABSTRACT

A screen filter comprising a plurality of rollers arranged in parallel, spaced relationship with a plurality of carriers positioned between the rollers with the axes of the carriers parallel to the axes of the rollers. An endless wire is wound spirally over the rollers and engages the surfaces of the carriers so as to form a screen. A driving means engages at least one of the rollers for driving the endless wire. The raw material to be screened is deposited onto the screen.

12 Claims, 5 Drawing Figures

SCREEN FILTER

BACKGROUND OF THE INVENTION

1. Field of the Invention

The present invention relates to a screen filter and, more particularly, to a filter for sifting or filtering powder or granular substances or the like.

2. Description of the Prior Art

Mechanical revolving screens and vibrating screens have been proposed in the prior art for industrial use as screen filters for filtering powders, granular substances and the like. While such screens satisfactorily achieve such basic functions as sorting out or filtering mixtures into groups according to the granular sizes thereof, they are defective in filtering adhesive substances, such as powdered detergent, since such materials tend to stick to the screen causing clogging of the mesh.

When the mesh becomes clogged, the substances to be filtered accumulate on the screen filter, thereby deteriorating the operational efficiency. Furthermore, the clogged mesh needs to be cleaned, requiring additional time and labor expense for the personnel in charge of such cleaning. Moreover, in performing the cleaning operation, workers are forced to work in a dust-hazardous environment as dust is expelled into the air when the dust cover over the filter is removed for cleaning.

SUMMARY OF THE INVENTION

According to the present invention, these problems are solved by providing a screen filter which can completely prevent clogging of the mesh thereof and does not require cleaning or opening of the dust cover, thereby improving the operational efficiency and the working environment. The present screen filter can filter and screen substances to minute grain sizes and can reduce the amount of unscreened substances left above the screen filter, thereby improving the yield of products out of raw materials. The driving means of the present screen filter is durable, having a long life, thereby being highly economical. The present filter offers a larger effective area which works as the screen filter than has been achieved heretofore.

Briefly, the present screen filter comprises a plurality of rollers arranged in parallel, spaced relationship, carriers positioned between the rollers with the axes of the carriers parallel to the axes of the rollers, an endless wire extending past and wound spirally over the rollers and engaging the surfaces of the carriers, and driving means for engaging one of the rollers for driving the endless wire.

The number of rollers and carriers is preferably determined depending on the scale of the screen filter. The surfaces of the rollers and carriers are preferably provided with grooves in a direction perpendicular to the respective axes. The vertical position of the rollers is preferably different. The vertical position of the carriers is preferably different from the vertical position of at least one of the rollers. The carriers are preferably rotatable.

It is preferable to provide a scraper or scrapers which either abut on the surface of the rollers or are provided in the path of the endless wire. Both the upper path and lower path of the wire is desirably made to pass along the upper surface of the carriers.

The driving direction of the driving means preferably alternates periodically and the driving speed of the wire by the driving means is in the range of 1 cm/sec.–10 m/sec., preferably 10 cm/sec. to 1 m/sec. It is also desirable to provide a vibrating source to impart mechanical vibration to the wire through the carriers, the vibrating source preferably generating vibration having a frequency of 0.3–30 Hz and an amplitude of 0.1–10 mm.

A crusher is preferably mounted above the spirally wound wire. A dust cover is desirably provided over all or a portion of the spirally wound wire. The wire is preferably in the form of a single wire or several wires twisted together of iron, steel, copper, coppery alloy, plastic, rubber or fiber including processed goods thereof, of 0.3–30 mm in diameter. The wire is wound at an interval of 0.3–100 mm. The rollers and carriers are preferably made of metal or plastic.

OBJECTS, FEATURES AND ADVANTAGES

It is therefore the object of the present invention to solve the problems encountered heretofor in filtering powder, granular substances and the like. It is a feature of the present invention to solve these problems by the provision of a novel screen filter. An advantage to be derived is a filter which prevents clogging of the mesh. A further advantage is a filter which does not require cleaning or opening of the dust cover. A still further advantage is a filter which improves operational efficiency and the working environment. Another advantage is a filter which can screen substances to minute grain sizes. Still another advantage is a filter which can reduce the amount of unscreened substances left above the filter, thereby improving the yield of products out of raw materials. Still another advantage is a filter having a durable and economical driving means.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

DESCRIPTION OF THE PREFERRED EMBODIMENTS

Figure 1:
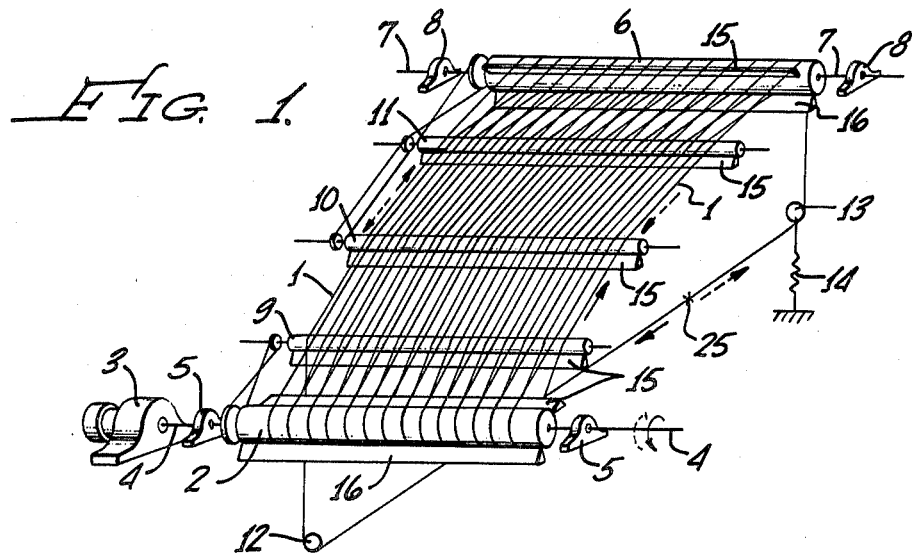
FIG. 1 is a perspective view of a first embodiment of screen filter constructed in accordance with the teachings of the present invention.
Figure 2:
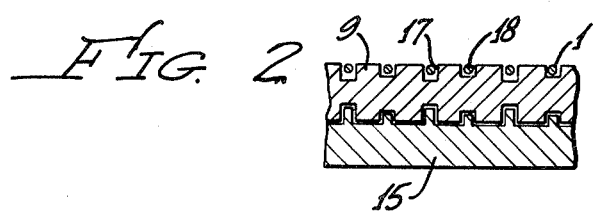
FIG. 2 is a partial longitudinal sectional view of a portion of the screen filter of FIG. 1.
Figure 3:
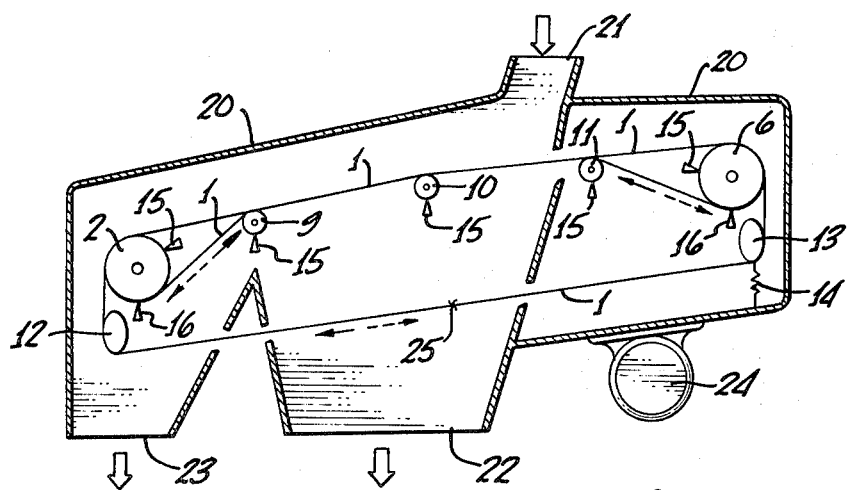
FIG. 3 is a side elevation view of the screen filter of FIG. 1.

Referring now to the drawings and, more particularly, to FIGS. 1–3 thereof, the first embodiment of screen filter includes an endless wire 1, a drive roller 2 and a motor 3. Motor 3 alternately rotates forwardly and backwardly at a predetermined time cycle to rotate driving roller 2 around a driving axis 4. Roller 2 is supported on axis 4 by means of bearings 5.

A second roller 6 is mounted on an axis 7 and supported by bearings 8. Roller 6 is positioned in parallel, spaced relationship relative to roller 2 with a suitable space therebetween. Roller 6 is driven around axis 7 by means of wire 1, as will be explained more fully hereinafter.

Each of rollers 2 and 6 has a plurality of parallel, spaced grooves formed in the surface thereof, in a direction perpendicular to the respective driving axes 4 and 7. The grooves are provided in order to guide wire 1 and to simultaneously prevent lateral displacement thereof. Positioned between rollers 2 and 7 are a plurality of carriers 9, 10 and 11. Carriers 9, 10 and 11 are positioned in parallel, spaced relationship between rollers 2 and 6 with the axes of carriers 9–11 parallel to the axes of rollers 2 and 6. Carrier 9 is coupled to roller 2 and rotates therewith in a direction opposite to that of roller 2. Carriers 10 and 11 are coupled to roller 6 and rotate in a direction opposite to that of roller 6.

As seen most clearly in FIG. 3, the vertical position of driving roller 2 is lower than that of driven roller 6 and carrier 9. The vertical position of carrier 9 is also lower than that of roller 6. By such an arrangement, wire 1, which is spirally wound around rollers 2 and 6 and carriers 9–11 and acts as the screen filter, is made to pass slantingly toward driving roller 2.

The present invention is characterized by wire 1 being wound over rollers 2 and 6 and carriers 9–11 in a uniquely spiral manner. As shown most clearly in FIGS. 1 and 3, wire 1 is first made to pass over the upper surfaces of driving roller 2 and carriers 9, 10 and 11 and then to pass under the lower surface of roller 6, then moving around roller 6 to reach the upper surface thereof. Then, wire 1 is directed to pass over the upper surfaces of carriers 11, 10 and 9 to the lower surface of roller 2, extending therearound to reach the upper surface thereof. This process continues in similar fashion with wire 1 being wound in a direction substantially perpendicular to rollers 2 and 6 and carriers 9, 10 and 11. In all cases, wire 1 extends into grooves in the surfaces of rollers 2 and 6 and carriers 9–11.

The final end of wire 1 is connected to the initial end thereof so as to make an endless wire. After extending over the left end of carrier 9, wire 1 extends around a pulley 12. After extending over the right end of roller 6, wire 1 extends around a pulley 13. Pulley 13 is provided with a spring 14 which adjusts the tension in wire 1. A single spring 14 will suffice to adjust the tension in wire 1 since wire 1 is endless.

According to the present invention, scrapers 15 are provided which abut on the side surfaces of rollers 2 and 6 and the lower surfaces of carriers 9–11, scrapers 15 extending for the entire lengths thereof. Scrapers 16 are also provided to abut on the lower surfaces of rollers 2 and 6. Scrapers 15 and 16 are provided for scraping off the substance to be screened which adheres to wire 1 and is carried thereby in order to clean wire 1 and the grooves in rollers 2 and 6 and carriers 9–11.

FIG. 2 shows one of scrapers 15 and the manner in which it engages carrier 9. Carrier 9 is provided with a plurality of alternate grooves 17 and 18 which extend in a direction perpendicular to the axis of carrier 9 in order to guide wire 1 and to prevent lateral displacement thereof. Groove 17 is adapted to receive wire 1 as it stretches from the upper surface of roller 2 while groove 18 is adapted to receive wire 1 extending from the upper surface of roller 6. Groove 17 has a depth greater than that of groove 18 so as to reduce the friction caused by the contact with wire 1 which is driven toward the rotational direction of carrier 9, thereby relieving the rotational resistance of carrier 9. As seen in FIG. 2, scraper 15 is provided with projecting pieces having lengths corresponding to the depths of grooves 17 and 18.

While the details of the remaining scrapers 15 and 16 and the grooves in the remaining rollers 2 and 6 and carriers 10 and 11 are not shown, the arrangement of these remaining parts are the same or similar to that shown in FIG. 2.

The present screen filter also includes a dust cover, generally designated 20. Dust cover 20 is provided to prevent the minute dust particles generated during the time of screening from spreading to the outside environment. In the upper portion of dust cover 20, there is provided a material inlet port 21 for the raw material or substances to be filtered, while in the lower portion thereof there is provided a product outlet port 22 for the screened products and a discharge port 23 for substances which are rejected and left upon the screen filter. Material inlet port 21 is located at an upper position between carriers 10 and 11. Product outlet port 22 is located at a lower position between carriers 9 and 11. Discharge port 23 is provided at a lower position between carrier 9 and driving roller 2.

A vibrating source 24 is attached at a convenient location on dust cover 20. Vibrating source 24 is driven by a motor (not shown) to give mechanical vibration to rollers 2 and 6, carriers 9, 10 and 11 and wire 1 through dust cover 20, thereby accelerating the filtering operation. The amplitude of vibration caused by source 24 may be adjusted in frequency and amplitude according to the type and size of the substances to be filtered. The scale of a screen filter so constructed is reduced when the maximum function is induced by the synergistic effect of changing and adjusting the wire driving direction, speed and amplitude, and adjusting the vibration frequency, period and amplitude.

In operation, motor 3 is started to move the knot 25 which connects the opposite ends of wire 1 so as to cause it to be located between pulleys 12 and 13. Then, motor 3 is driven to repeat the forward and backward rotations alternately in a predetermined time cycle. The timing for the above mentioned cycle is preferably determined so that knot 25 can reciprocate between pulleys 12 and 13 in order to prevent it from moving between carriers 9 and 11 to disarrange the predetermined interval space between the stretches of wire 1.

Then, the raw material to be filtered is supplied from material inlet port 21 in dust cover 20 onto wire 1, between carriers 10 and 11. When motor 3 is rotating in the forward direction, wire 1 is driven in the direction of the arrow shown in solid lines adjacent driving axis 4, roller 2 rotating carrier 9, wire 1 rotating roller 6, and roller 6 driving carriers 10 and 11. At this time, the alternate extensions of wire 1 between carriers 9 and 11 move in opposite directions to give a crumbling effect to wire 1. When motor 3 is rotated in the backward directon, wire 1 moves in the direction of the arrow shown in broken lines adjacent driving axis 4.

If vibration is given to the entire apparatus by vibrating source 24 simultaneously with the driving of motor 3, the substance placed between carriers 9 and 11 is filtered effectively and is discharged from product outlet port 22. The substance which has not been filtered is rolled down toward driving roller 2 because of the inclination of wire 1 and falls from discharge port 23.

Figure 4:
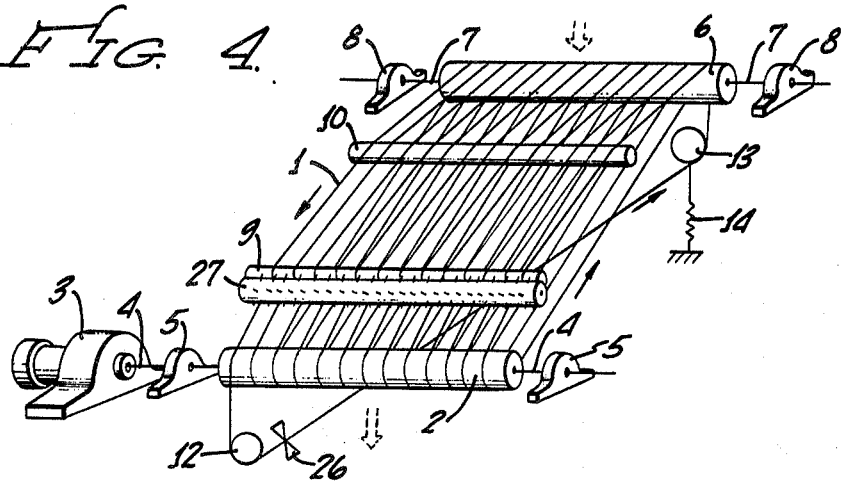
FIG. 4 is a perspective view of a second embodiment of screen filter constructed in accordance with the teachings of the present invention.
Figure 5:
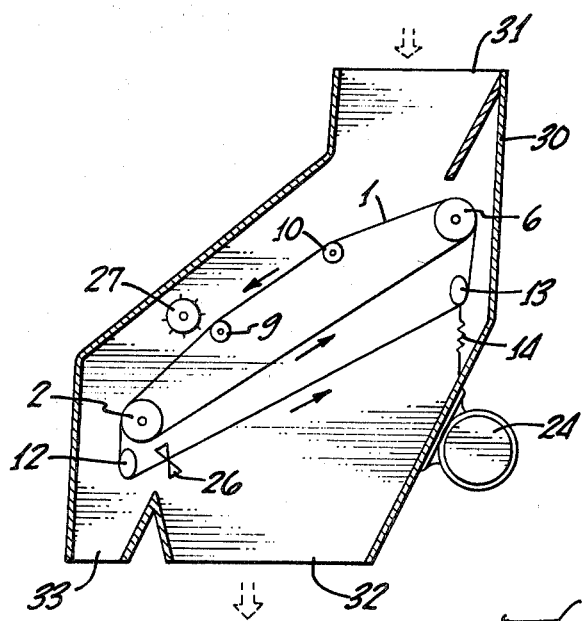
FIG. 5 is a side elevation view of the screen filter of FIG. 4.

Referring now to FIGS. 4 and 5, there is shown an alternate embodiment of the present invention wherein like numerals have been given like parts. The unique feature of the construction of this embodiment lies in the manner of spiral winding of wire 1 over the driving roller 2, the driven roller 6 and the carriers 9 and 10. More specifically, wire 1 is stretched on driving roller 2 and driven roller 6 to be spirally wound at a small interval space on the surfaces of both rollers 2 and 6 so that wire 1 passes in only a single direction along the upper surfaces of carriers 9 and 10, rather than having alternate lengths of wire 1 moving in opposite directions as in the embodiment of FIGS. 1-3.

In the embodiment of FIGS. 4-5, a scraper 26 is provided along the path of wire 1, near pulley 12, to scrape off the substances adhered thereto. Furthermore, a crusher 27 is placed above wire 1 at a location parallel to and closely adjacent to carrier 9. Crusher 27 is provided with a plurality of projections in the form of needles on the surface of a roller. These projections are driven when wire 1 is driven to crush caked substances or substances of a size larger than the size of the mesh. Crusher 27 may be driven through a coupling with motor 3 or roller 2. An explanation of the remaining structure is omitted since it is substantially identical to that of the embodiment of FIGS. 1-3.

When motor 3 is driven, the driving force is transmitted through driving axis 4 to rotate roller 2. The revolution of roller 2 moves wire 1 in the direction of the arrows shown in solid lines in FIGS. 4 and 5 to rotate roller 6. Wire 1 keeps on moving in a single direction until such time as motor 3 stops.

In a manner similar to the embodiment of FIGS. 1-3, the embodiment of FIGS. 4-5 includes a dust cover 30 which is provided for the same purpose as dust cover 20. Dust cover 30 includes a material inlet port 31 in the upper portion thereof for the raw material or substances to be filtered, while in the lower portion thereof, there is provided a product outlet port 32 for the screened products and a discharge port 33 for substances which are rejected and left upon the screen filter.

The raw material is supplied onto wire 1 from the direction of the arrow marked in dotted lines in FIGS. 4 and 5. The supplied material moves along wire 1 and is screened and filtered through the meshes of the wire down in a direction of the arrow marked in dotted line form in the lower part of the figures. The larger size substances which have not been screened down through the mesh of wire 1 moves to the location of the crusher 27 and is crushed and screened down then and there. The substances adhered to wire 1 is scraped off by scraper 26. The scraper 26 and crusher 27 described in the second embodiment may be installed in the first embodiment.

While the invention has been described with respect to the preferred physical embodiments constructed in accordance therewith, it will be apparant to those skilled in the art that various modifications and improvements may be made without departing from the scope and spirit of the invention. Accordingly, it is to be understood that the invention is not to be limited by the specific illustrative embodiments, but only by the scope of the appended claims.

We claim:

1. A screen filter comprising:
a plurality of rollers arranged in parallel, spaced relationship;
carriers positioned between said rollers with the axes of said carriers parallel to the axes of said rollers;
a wire extending past and wound spirally over said rollers and engaging the surfaces of said carriers; and
driving means for engaging at least one of said rollers for driving said wire, including means for periodically alternating, in a predetermined time cycle, the direction of driving of said wire to effectively prevent clogging thereof.

2. A screen filter according to claim 1, wherein said wire is an endless wire.

3. A screen filter according to claim 1 or 2, wherein alternate lengths of said wire move in opposite directions.

4. A screen filter according to claim 1 or 2, wherein said wire engages the upper surfaces of said carriers.

5. A screen filter according to claim 1 or 2, further comprising:
a crusher mounted above said wire.

6. A screen filter according to claim 1, wherein the vertical position of one of said plural rollers is different from the vertical position of another one thereof.

7. A screen filter according to claim 6, wherein the vertical position of at least one of said carriers is different from the vertical position of at least one of said rollers.

8. A screen filter according to claim 1, further comprising:
a scraper positioned in the path of said wire.

9. A screen filter according to claim 8, wherein said scraper is positioned to abut on the surface of one of said rollers.

10. A screen filter according to claim 8 or 9, wherein a scraper is provided to abut on the surface of one of said carriers.

11. A screen filter according to claim 1, further comprising:
a dust cover positioned to cover the whole or a portion of the path of said wire.

12. A screen filter according to claim 1, 2, or 11, further comprising:
a vibrating source coupled to mechanically vibrate one or more of said rollers, carriers and wire.

* * * * *